(12) United States Patent
Knox

(10) Patent No.: US 6,193,275 B1
(45) Date of Patent: Feb. 27, 2001

(54) OCCUPANT BELT PRESENTER

(75) Inventor: Matthew J. Knox, Romulus, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/325,789

(22) Filed: Jun. 1, 1999

(51) Int. Cl.[7] .................................................. B60R 21/10
(52) U.S. Cl. ............................................................ 280/808
(58) Field of Search ................................... 280/808, 806, 280/807

(56) References Cited

U.S. PATENT DOCUMENTS

| | | |
|---|---|---|
| 3,854,749 | 12/1974 | Fieni . |
| 4,531,762 * | 7/1985 | Sasaki et al. ........................ 280/808 |
| 4,552,381 | 11/1985 | Schlanger . |
| 4,629,214 * | 12/1986 | Föhl ..................................... 280/808 |
| 4,796,915 | 1/1989 | Kaurich et al. . |
| 5,061,012 | 10/1991 | Parker et al. . |
| 5,087,075 * | 2/1992 | Hamaue .............................. 280/806 |
| 5,123,673 | 6/1992 | Tame . |
| 5,431,446 | 7/1995 | Czarnecki et al. . |
| 5,538,283 * | 7/1996 | Townsend ........................... 280/808 |
| 5,570,933 | 11/1996 | Rouhana et al. . |

* cited by examiner

*Primary Examiner*—Kenneth R. Rice
(74) *Attorney, Agent, or Firm*—Sally J. Brown

(57) ABSTRACT

An occupant seat belt presenter is provided to extend or present an unbuckled seat belt restraint or web to the occupant, thereby making it visible and easily accessible for buckling. This seat belt presenter is provided with a powered presenter drive which moves the seat belt web forward or rearward based on signals received from a controller. The controller controls the operation of the seat belt presenter based on such inputs as whether the door is open and whether the seat belt has been buckled. This controller is adapted to be integrated into the seat and to be compatible with other vehicle safety features. The seat belt restraint is allowed to extend and to retract freely through a web guide attached to the presenter drive. This invention also provides that the belt web restraint can be easily removed from the web guide in the event of a system malfunction, thereby providing an override to the controller.

18 Claims, 8 Drawing Sheets

OCCUPANT BELT PRESENTER

BACKGROUND OF THE INVENTION

1. Field of the Invention

This invention relates to vehicle occupant restraints. More specifically this invention relates to seat belt restraints and still more particularly to seat belt extenders to ease the location and buckling of seat belt devices.

2. Description of Related Art

A variety of seat belt devices are well known in the prior art, however, most prior primary vehicle occupant restraint systems employ anchors fixed in location and do not address the ease of use requirements of large or heavily clothed occupants.

For general background material, the reader is directed to the following United States patents, each of which is hereby incorporated by reference for the material disclosed therein.

U.S. Pat. No. 3,854,749 describes a safety belt installation designed to enable a vehicle user to accede to and leave his seat easily and to ensure that the user is necessarily wearing his safety belt when he is seated, with no catch or buckle being required.

U.S. Pat. No. 4,552,381 describes a passenger restraint safety system for a passenger type automobile having a chassis, a passenger seat and a door providing access to said passenger seat.

U.S. Pat. No. 4,796,915 describes a seat belt extender for positioning a seat belt being unwound from a seat belt retractor, that includes two or more multiplastic sleeves telescopically slidable relative one another between retracted and extended positions and having belt passages through which the belt passes from the retractor toward the occupant.

U.S. Pat. No. 5,061,012 describes a child car seat having an improved restraint system in which the restraint system may be easily connected and disconnected, automatically placed about the child in the proper position, and automatically adjusted to properly secure the child within the seat.

U.S. Pat. No. 5,123,673 describes a seat belt system for use with a vehicle seat, which includes a three point belt system forming a lap belt and a shoulder belt and further includes a second shoulder belt to form a four point system.

U.S. Pat. No. 5,431,446 describes a seat belt presenter for an active seat belt system for restraining a vehicle occupant that includes a guide having surfaces, which surround opposite major side surfaces of belt webbing.

U.S. Pat. No. 5,570,933 describes a seat belt assembly in a vehicle for restraining an occupant that includes a lap-shoulder belt assembly and a lap-shoulder belt extender assembly.

SUMMARY OF THE INVENTION

It is desirable to provide an occupant belt presenter that enhances a vehicle occupant's comfort when using a safety restraint device. Moreover, it is desirable to provide an occupant safety belt presenter that will extend or present the unbuckled safety belt restraint to the occupant in a manner that makes the safety belt buckle visible and easily obtainable for eventual buckling and to reduce the inconvenience to the occupant of buckling the seat belt restraint, thereby encouraging the use of seat belt vehicle safety restraints.

Therefore, it is a general object of this invention to provide an occupant seat belt presenter that enhances the occupant's convenience and comfort when using the vehicle occupant restraint.

It is a further object of this invention to provide an occupant seat belt presenter that extends or presents the unbuckled restraint to the occupant in a manner that makes it visible and easily obtainable for eventual buckling.

It is another object of this invention to promote occupant use of vehicle seat belt restraints by providing an improved opportunity to locate, reach and buckle the restraint properly with minimal effort.

Another object of this invention is to provide an occupant seat belt presenter that is capable of being adapted into integrated vehicle seat systems.

A further object of this invention is to provide an occupant seat belt presenter that can interact easily with existing power seat drive mechanics.

A still further object of this invention is to provide an occupant seat belt presenter that can serve as a belt slack take up drive and thereby result in optimized restraint comfort and performance.

It is a further object of this invention to provide an occupant seat belt presenter that utilizes outboard lower seat track mounting for the extend and retract drive mechanics.

Another object of this invention is to provide an occupant seat belt presenter that permits the seat belt restraint to be simply and easily removed in the event of a system malfunction.

These and other objects of this invention are intended to be covered by this disclosure and are readily apparent to those of ordinary skill in the art upon review of the drawings, detailed description, claims and abstract of this disclosure.

BRIEF DESCRIPTION OF THE DRAWINGS

The accompanying drawings incorporated in and forming a part of the specification, illustrate a preferred embodiment of the present invention. Some although not all, alternative embodiments are described in the following description. In the drawings.

Reference will now be made in detail to the present preferred embodiment of the invention, an example of which is illustrated in the accompanying drawings.

DETAILED DESCRIPTION OF THE INVENTION

This invention is an occupant safety-belt presenter specifically adapted to present/extend the restraint within the visible reach of the vehicle occupant, thereby allowing the occupant to access and buckle the restraint with minimal effort. The preferred embodiment of this invention includes a seat belt with a buckle, a belt presenter drive, a belt presenter guide, and a control circuit and logic.

Figure 1:
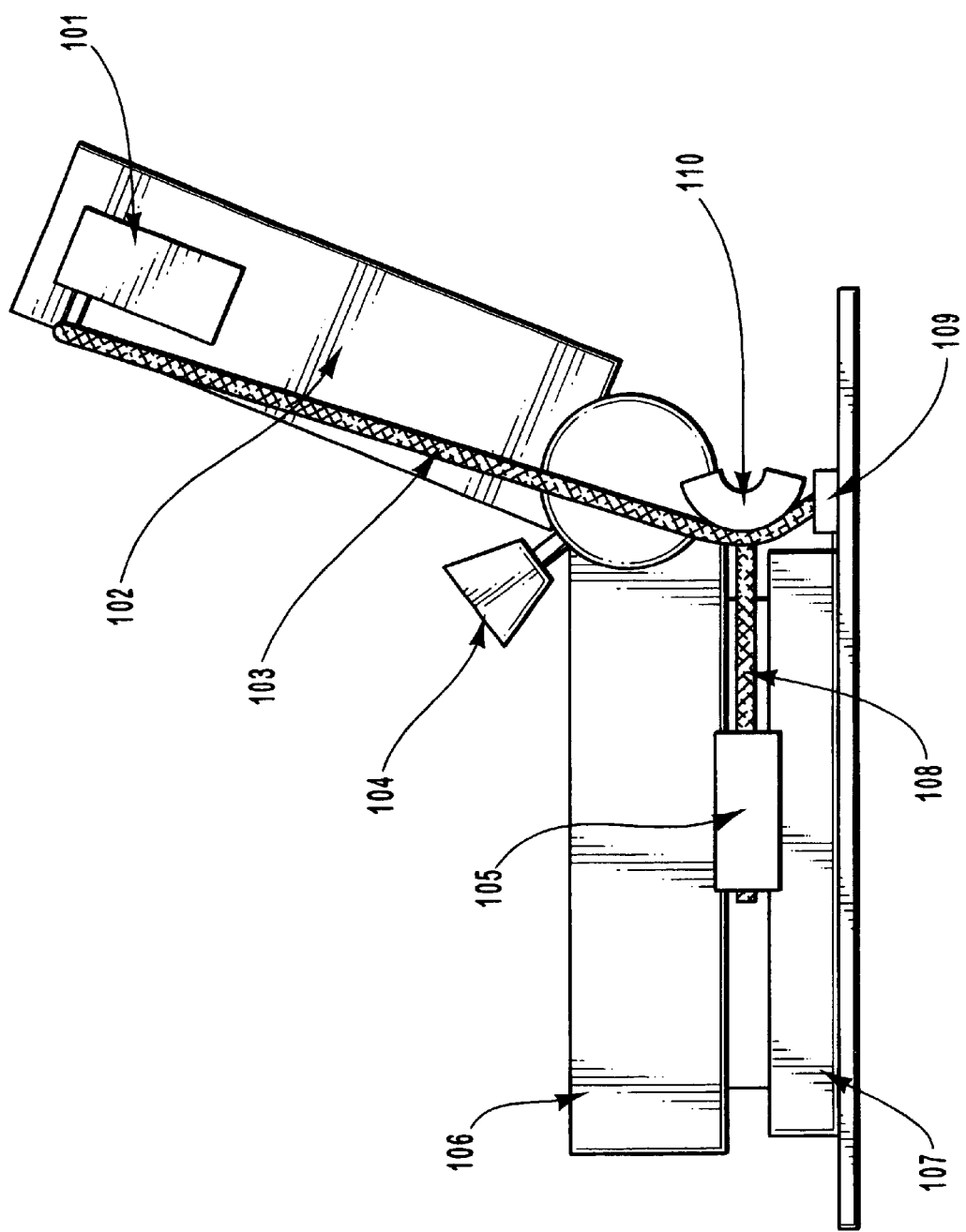
FIG. 1 depicts a side view of the preferred occupant seat belt presenter with a belt in the seat, in the retracted position.

FIG. 1 shows the side view of the preferred occupant seat belt presenter of this invention, with a belt in the seat in the retracted position. In this configuration the buckle is not engaged and the vehicle door or doors are open. The seat belt webbing 103 is shown attached to a standard automobile seat, which has a seat base 106 and a seat back 102. The other end of the seat belt webbing 103 is fixed to the vehicle body at an anchor point 109. The webbing 103 is attached at one end in a seat belt retractor 101. In this embodiment the retractor 101 is mounted to the seat back 102, alternative embodiments can have the retractor 101 mounted to the vehicle body. A seat belt buckle 104 is provided, fixed to the seat, for receiving the belt tongue. The belt presenter drive unit 105 is shown, fixed to the seat track/frame 107, with a belt presenter drive mechanism 108, preferably the drive mechanism 108 can be a belt, gear or cylinder drive. Attached to the belt presenter drive mechanism 108 is the belt presenter web-guide 110.

Figure 2:
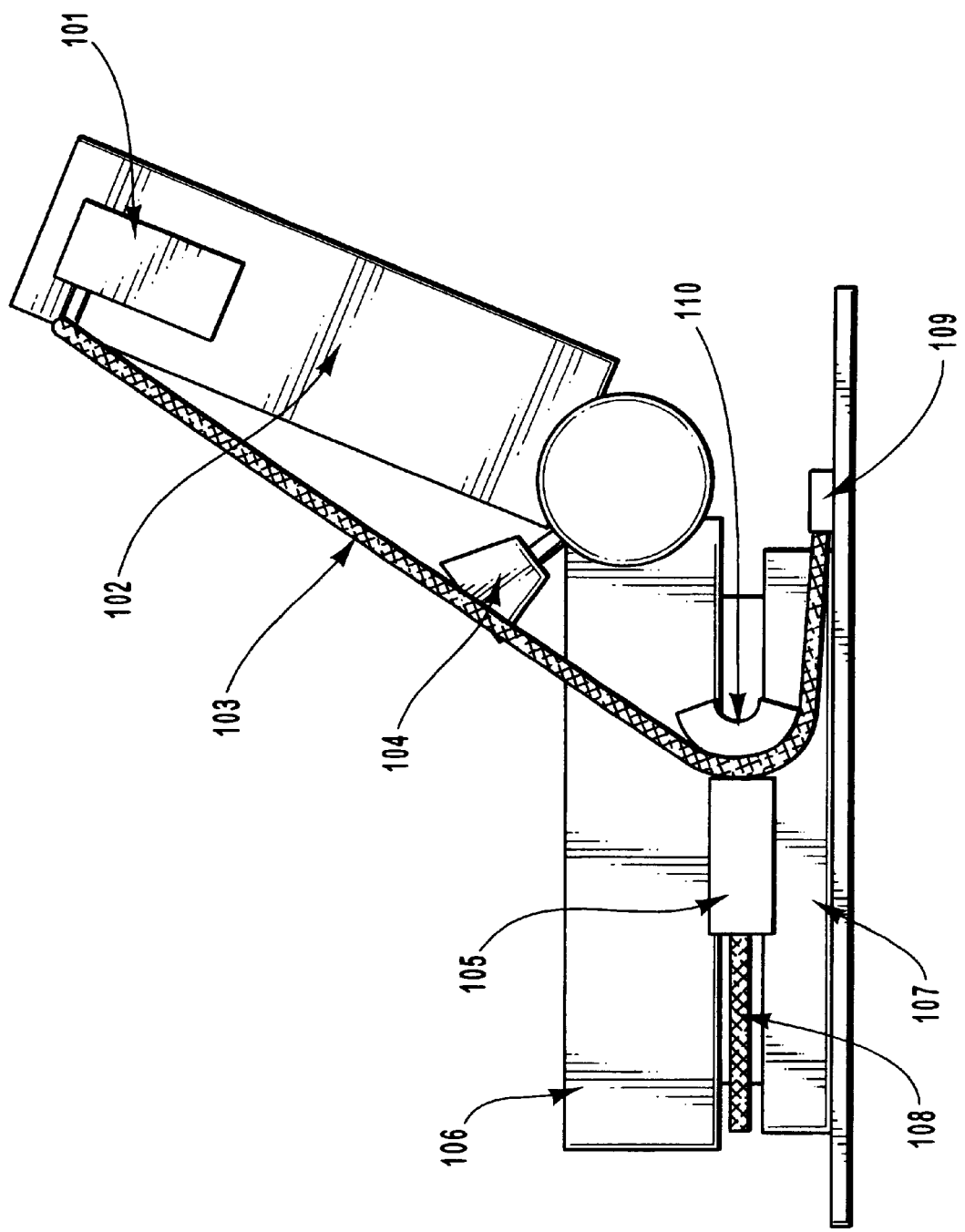
FIG. 2 depicts a side view of the preferred occupant seat belt presenter with a belt in the seat, in the extended position.

FIG. 2 shows a side view of the preferred occupant seat belt presenter with a belt in the seat, in the extended position. This configuration depicts the seat belt presenter with the buckle not engaged and the doors closed. This view shows the belt presenter drive mechanism 108 extended forward bringing with it the web-guide 110 and with it the belt webbing 103. The other components, the retractor 101, the seat back 102, the restraint buckle 104, the belt presenter drive unit 105, the seat base 106, the seat frame 107, and the anchor point 109 are as described in FIG. 1. The extension of the belt webbing 103 enhances the occupant's access to the belt for fixing the belt to the buckle 104.

Figure 3:
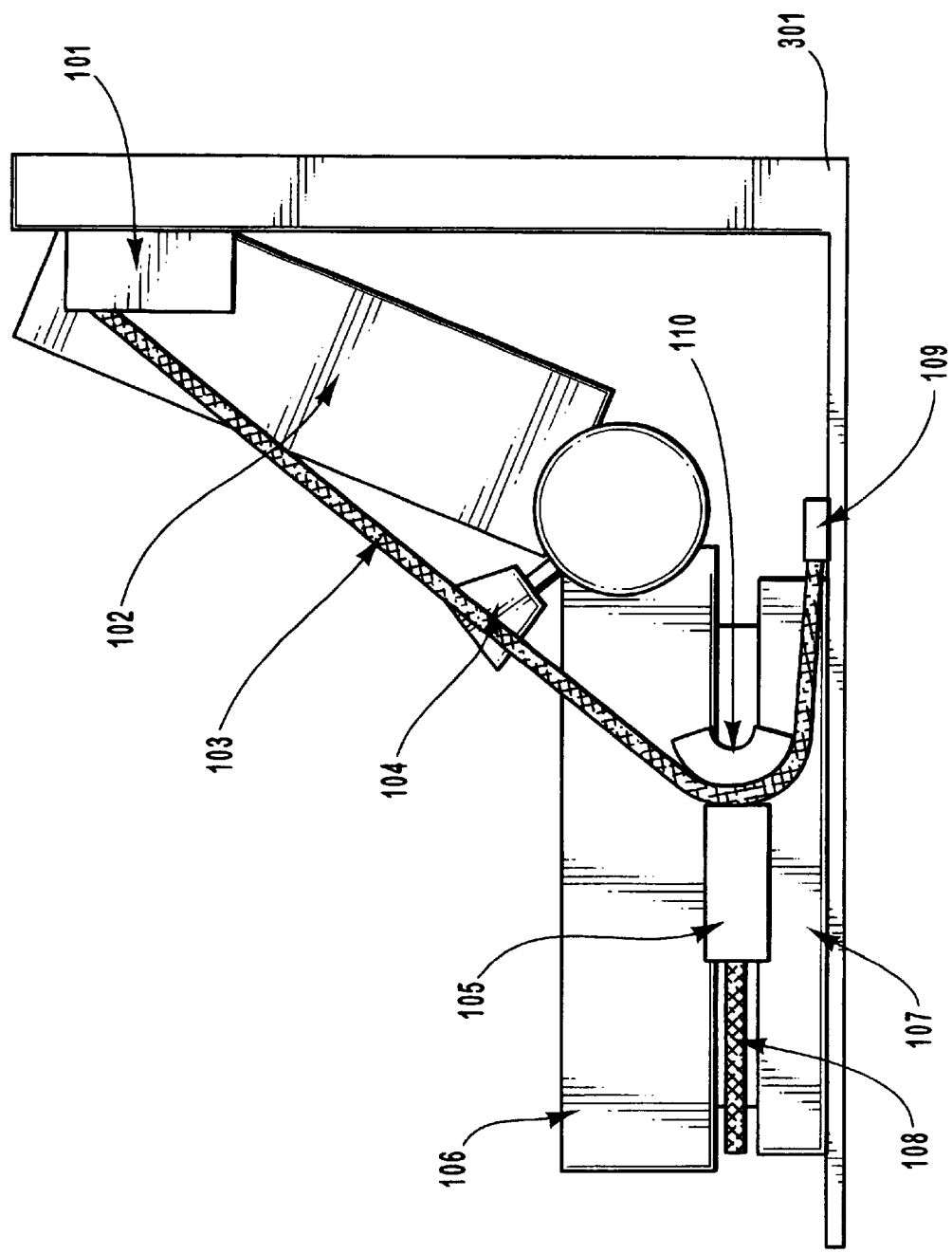
FIG. 3 depicts a side view of the preferred occupant seat belt presenter with a belt in the B-pillar, in the extended position.

FIG. 3 shows a side view of the preferred occupant seat belt presenter with a belt in the B-pillar, in the extended position. This view has the retractor 101 fixed to the body 301 of the vehicle rather than to the seat back 102. Otherwise all of the components of this invention are as described previously in FIGS. 1 and 2.

Figure 4:
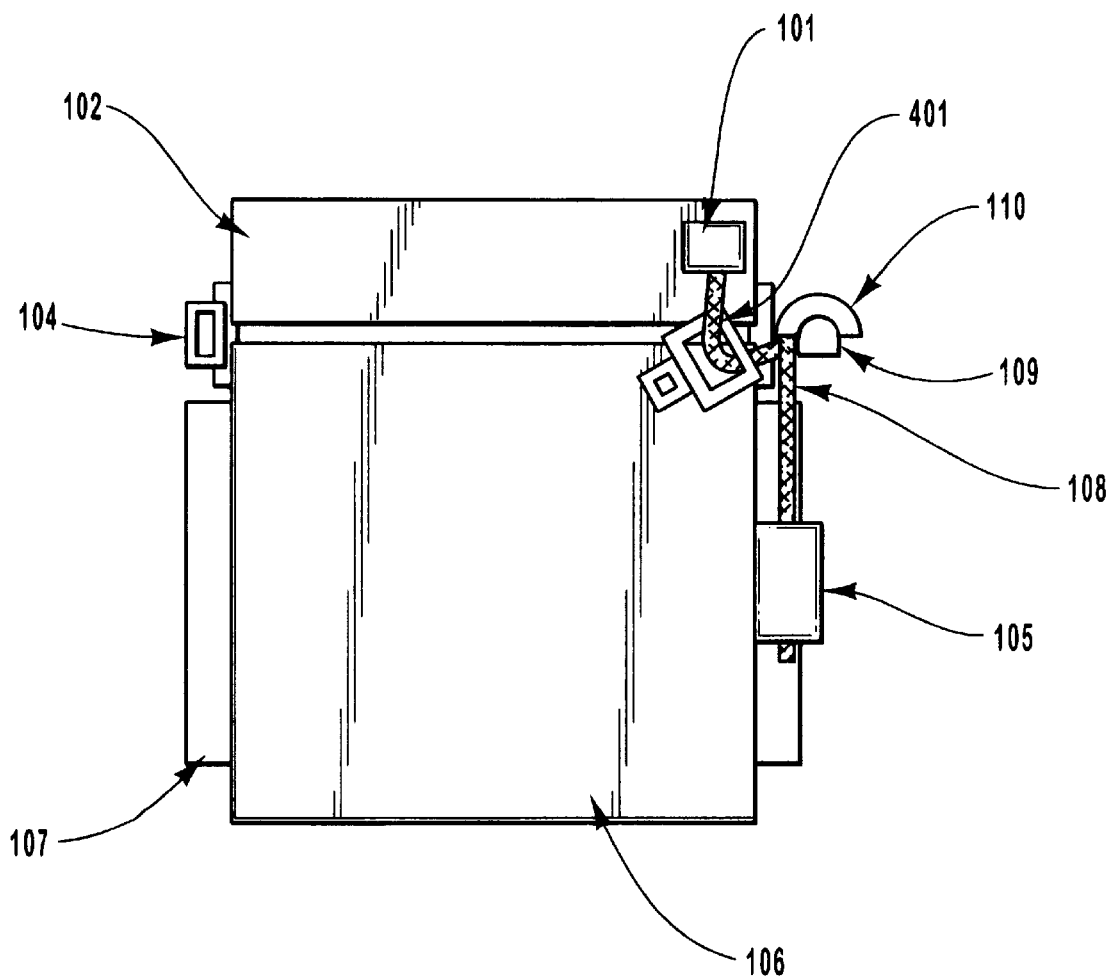
FIG. 4 depicts a top view of the preferred occupant seat belt presenter with a belt in the seat, in the retracted position.

FIG. 4 shows a top view of the preferred occupant seat belt presenter with a belt in the seat, in the retracted position. This view shows the retractor 101 fixed to the seat back 102. The restraint belt latch plate 401 is retracted in its typical buckle not engaged, doors open configuration. The restraint buckle 104 is shown in it typical position across the seat base 106 from the retracted belt latch plate 401. The belt presenter drive unit 105 is shown receiving the belt presenter drive mechanism 108, which in turn is attached to the web-guide 110, shown in the retracted position.

Figure 5:
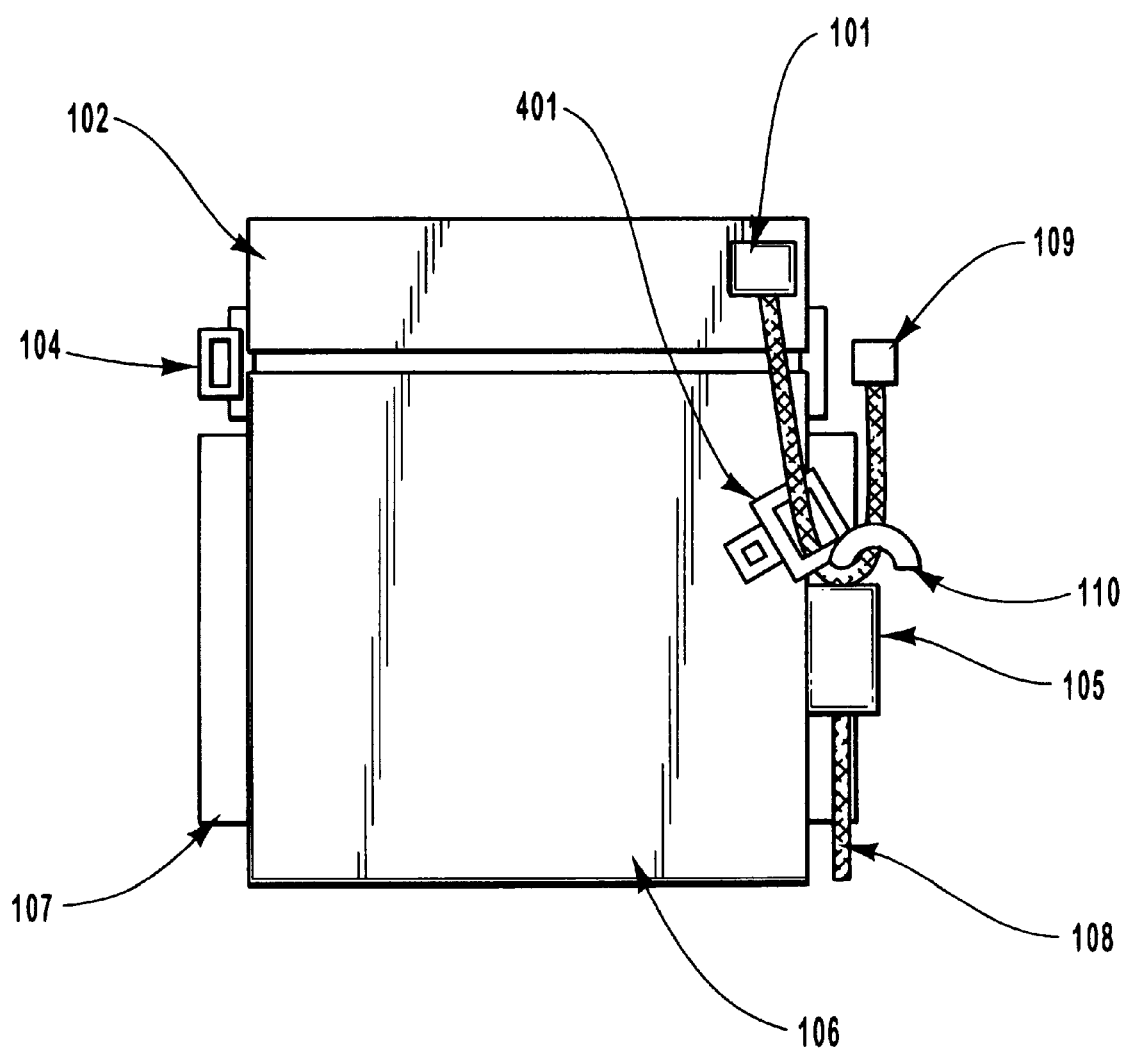
FIG. 5 depicts a top view of the preferred occupant seat belt presenter with a belt in the seat, in the extended position.

FIG. 5 shows a top view of the preferred occupant seat belt presenter with a belt in the seat, in the extended position. This view shows the belt presenter drive mechanism 108 in the extended position, thereby pulling the web-guide 110 forward, which in turn brings the belt latch-plate 401 forward to a more easily accessible position. The other components are provided and shown as described previously in FIG. 4.

Figure 6:
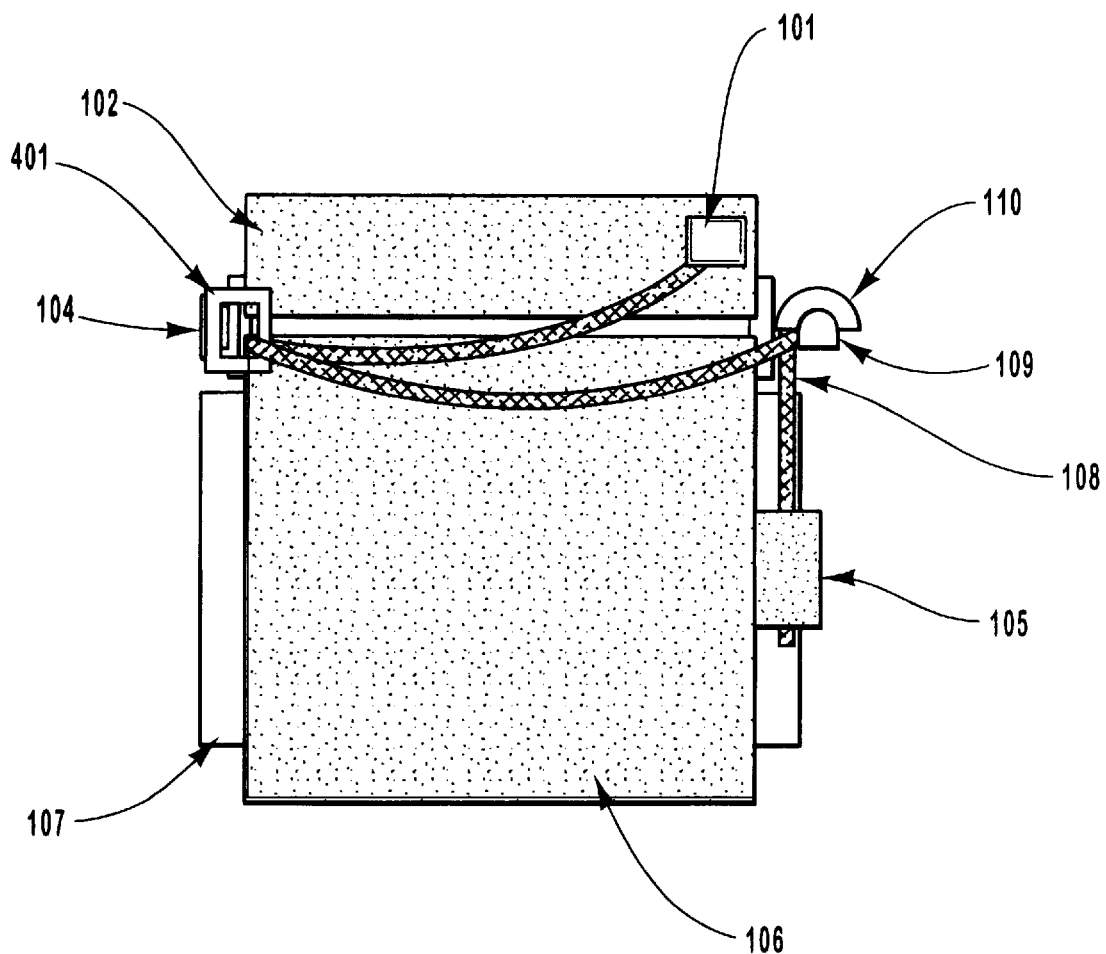
FIG. 6 depicts a top view of the preferred occupant seat belt presenter with a belt in the seat, in the retracted position.

FIG. 6 shows a top view of the preferred occupant seat belt presenter with a belt in the seat, in the retracted position. This view shows the seat belt restraint buckle 401 engaged with the restraint buckle 104. The belt presenter drive mechanism 108 is fully retracted, thereby retracting the web-guide 110 back cinching the belt web back. The other components are provided and shown as previously described.

Figure 7:
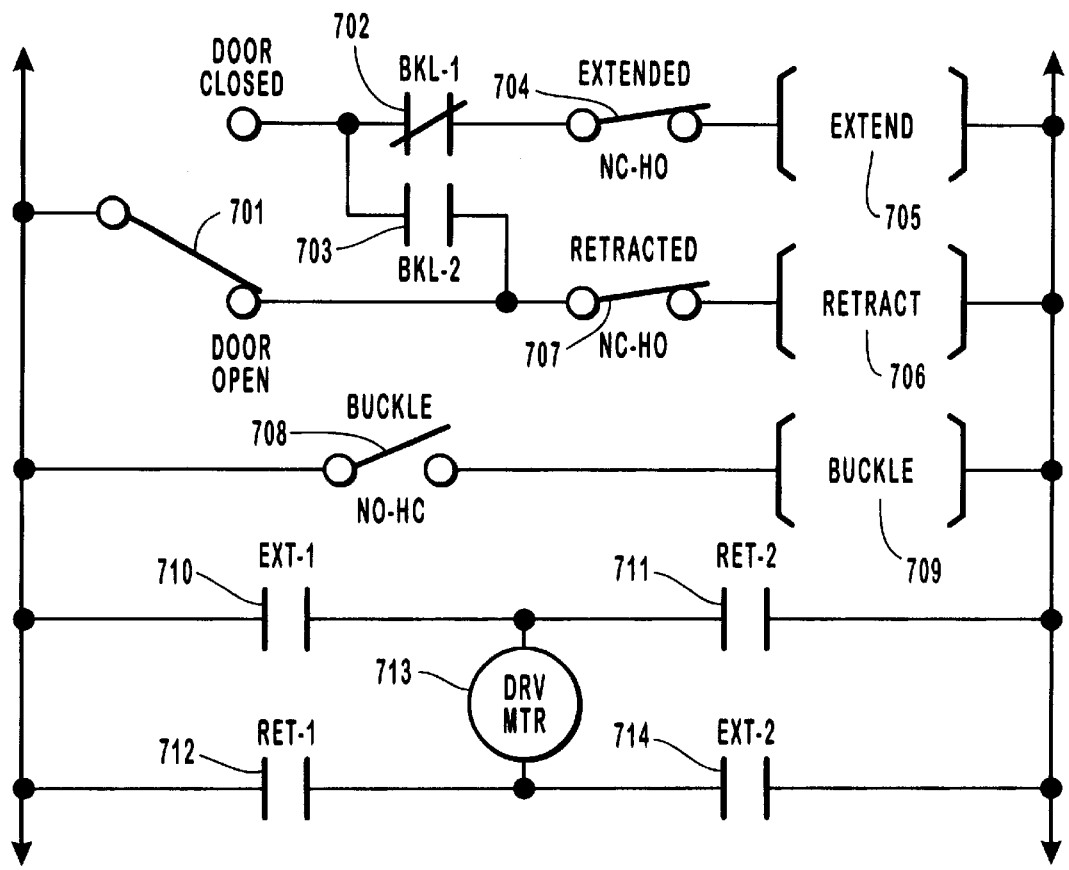
FIG. 7 depicts the preferred control logic and circuit of the occupant seat belt presenter of this invention.

FIG. 7 shows the preferred control logic and circuit of the occupant seat belt presenter of this invention. A door status switch 701 is used to sense whether the door is open or closed. Electrically connected to the door closed side of the door status switch 701 are buckle status sensors 702, 703. The buckle unlatched (belt not being used) status sensor 702 is electrically connected to a switch 704, which is closed to extent 705 the belt presenter. The buckle latched (belt being used) status sensor 703 is electrically connected to a switch 707, which is closed to retract 706 the belt presenter. Similarly, if the door status switch 701 is set to door open, the switch 707 is closed to retract 706 the belt presenter. A buckle switch 708 is provided to set the buckle status 709. The drive motor enable circuit 713 is provided based on the extension 710, 714 or retraction 711, 712 of the presenter. A presenter logic diagram 715 is shown to present the preferred logic of the control circuit. In sum, if the belt is not being used and the door is closed, then extend the presenter. If the belt is not being used and the door is open, then retract the presenter. If the belt is being used and the door is closed, then retract the presenter. If the belt is being used and the door is open, then retract the presenter.

Figure 8:
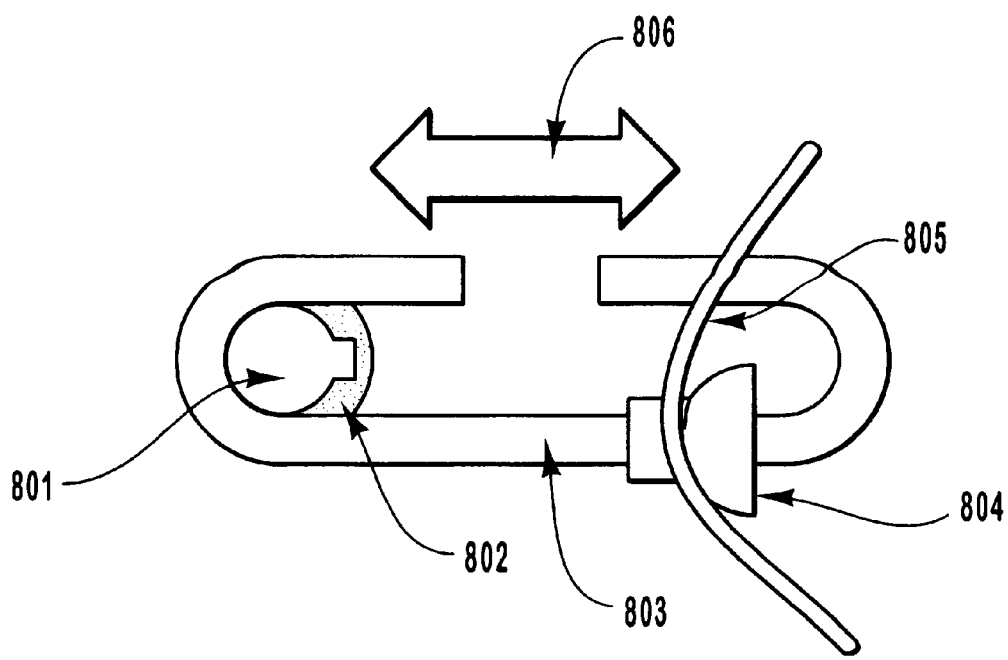
FIG. 8 depicts the preferred belt drive of the occupant seat belt presenter of this invention.

FIG. 8 shows a preferred belt drive mechanism 108 of the occupant seat belt presenter of this invention. This figure shows a detailed view of the restraint web-guide 804 with the restraint web 805. The web-guide 804 is fixed to a notched belt 803, which in turn is wrapped around a drive belt gear 801. The drive belt gear 801 is fixed to a drive motor 802. The drive motor 802 is a bi-directional 806 drive.

Figure 9:
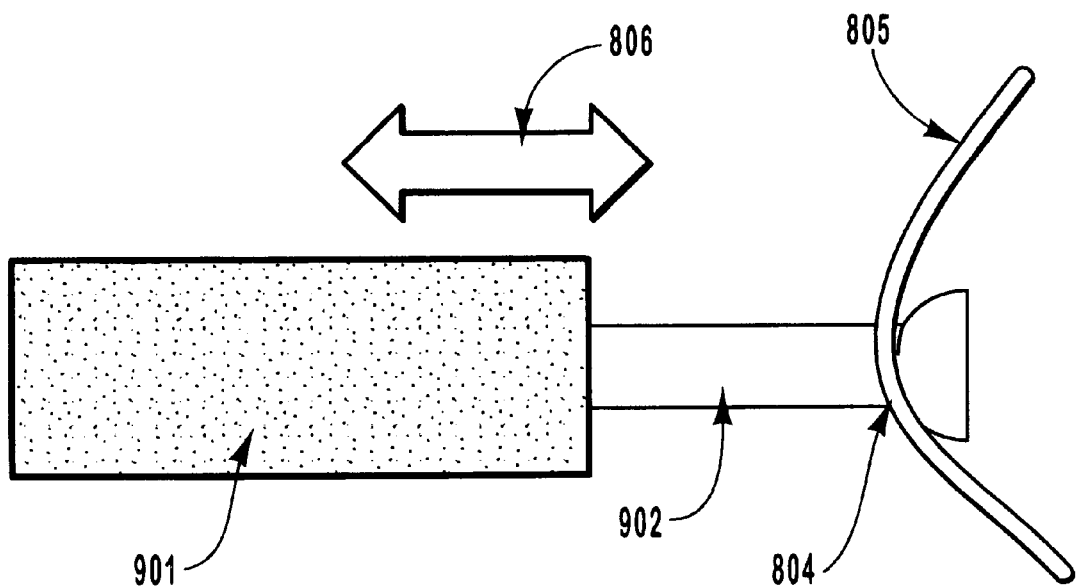
FIG. 9 depicts the preferred cylinder drive of the occupant seat belt presenter of this invention.

FIG. 9 shows an alternative preferred cylinder drive of the occupant seat belt presenter of this invention. Again, a bi-directional 806 drive is provided. This embodiment uses an air or hydraulic cylinder 901 driving a shaft 902, which is attached to the web guide 804, which in turn hold the restraint web 805.

The described embodiments and components are to be considered in all respects only as illustrative and not as restrictive. Although the embodiments shown here provide particular orientations and positions of component parts of the occupant seat belt presenter of this invention, this invention is not limited thereto. The scope of this invention is indicated by the appended claims rather than by the foregoing description. All changes, which come within the meaning and range of equivalency of the claims, are to be embraced as within their scope.

I claim:

1. A occupant seat belt presenter system, comprising:
   (A) a vehicle seat, having a seat back attached to a seat base attached to a vehicle frame;
   (B) a seat belt retractor;
   (C) a seat belt webbing, having a first end and a second end, wherein said first end is connected to said seat belt retractor;
   (D) an anchor attached to said second end of said seat belt webbing;
   (E) a seat track mount; and
   (F) a belt presenter attached to said seat belt webbing for extending and retracting said belt webbing, wherein said belt presenter mechanism is mechanically attached to said seat track mount.

2. An occupant seat belt presenter system, as recited in claim 1, further comprising:
   a controller for controlling said belt presenter.

3. An occupant seat belt presenter system, as recited in claim 1, wherein said seat belt retractor is attached to said seat back.

4. An occupant seat belt presenter system, as recited in claim 1, wherein said seat belt retractor is attached to a vehicle frame.

5. An occupant seat belt presenter system, as recited in claim 1, wherein said belt presenter further comprises:

(1) a belt presenter drive unit; and (2) a belt presenter mechanism.

6. An occupant seat belt presenter system, as recited in claim 5, wherein said belt presenter mechanism is a belt drive mechanism.

7. An occupant seat belt presenter system, as recited in claim 5, wherein said belt presenter mechanism is a gear drive mechanism.

8. An occupant seat belt presenter system, as recited in claim 5, wherein said belt presenter mechanism is a hydraulic cylinder drive mechanism.

9. An occupant seat belt presenter system, as recited in claim 5, wherein said belt presenter mechanism is a pneumatic cylinder drive mechanism.

10. An occupant seat belt presenter system, as recited in claim 5, wherein said belt presenter further comprises a web guide attached to said belt presenter mechanism and wherein said web guide is adapted to hold said belt web.

11. An occupant seat belt presenter system, as recited in claim 5, wherein said belt presenter mechanism has a bi-directional drive.

12. An occupant seat belt presenter system, as recited in claim 2, wherein said controller retracts and extends said belt presenter based on whether a door is open.

13. An occupant seat belt presenter system, as recited in claim 2, wherein said controller retracts and extends said belt presenter based on whether said seat belt web is buckled.

14. An occupant seat belt presenter system, as recited in claim 2, wherein said controller includes a seat belt slack sensor and which can tighten and loosen said seat belt web based upon said sensed seat belt slack.

15. An occupant seat belt presenter system, as recited in claim 1, wherein said seat belt web is removable from said belt presenter in the event of a system malfunction.

16. An occupant seat belt presenter system, as recited in claim 1, further comprising a buckle attached to said seat base for receiving a seat belt latch plate.

17. An occupant seat belt presenter system, as recited in claim 1, wherein said seat is a vehicle driver's seat.

18. An occupant seat belt presenter system, as recited in claim 1, wherein said seat is a passenger seat.

* * * * *